US010173720B2

(12) United States Patent
Kozawa et al.

(10) Patent No.: US 10,173,720 B2
(45) Date of Patent: Jan. 8, 2019

(54) SENSOR DEVICE AND ELECTRIC POWER STEERING DEVICE USING SAME

(71) Applicant: DENSO CORPORATION, Kariya, Aichi-pref. (JP)

(72) Inventors: Takaharu Kozawa, Kariya (JP); Shuji Kuramitsu, Kariya (JP); Kouichi Nakamura, Kariya (JP); Masaya Taki, Kariya (JP); Toshimitsu Sakai, Kariya (JP); Katsuhiko Hayashi, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 130 days.

(21) Appl. No.: 15/222,691

(22) Filed: Jul. 28, 2016

(65) Prior Publication Data
US 2017/0029016 A1 Feb. 2, 2017

(30) Foreign Application Priority Data

Jul. 31, 2015 (JP) .................................. 2015-151858

(51) Int. Cl.
| *B62D 5/04* | (2006.01) |
| *B62D 6/10* | (2006.01) |
| *G01L 3/10* | (2006.01) |
| *G01L 25/00* | (2006.01) |
| *G01D 18/00* | (2006.01) |

(52) U.S. Cl.
CPC ............ *B62D 5/049* (2013.01); *B62D 5/0463* (2013.01); *B62D 6/10* (2013.01); *G01D 18/00* (2013.01); *G01L 3/101* (2013.01); *G01L 25/00* (2013.01)

(58) Field of Classification Search
CPC ........ B62D 5/0463; B62D 5/049; B62D 6/10; G01D 18/00; G01L 3/101; G01L 25/00
See application file for complete search history.

(56) References Cited

U.S. PATENT DOCUMENTS

| 6,397,969 B1* | 6/2002 | Kasai ................... B62D 5/0481 180/404 |
| 2004/0128042 A1* | 7/2004 | Takahashi .............. B62D 5/003 701/41 |
| 2007/0169987 A1* | 7/2007 | Fujiyama ............. B62D 5/0463 180/446 |

(Continued)

*Primary Examiner* — Stephen Holwerda
(74) *Attorney, Agent, or Firm* — Knobbe, Martens, Olson & Bear, LLP

(57) ABSTRACT

A sensor device includes two sensor parts and an ECU. An output division of one of the two sensor parts stops output of an output signal when a detected internal abnormality is a first abnormality. Further, when the detected internal abnormality is a second abnormality that is different from the first abnormality, the output division controls an abnormality signal to take a value indicative of the second abnormality. An abnormality determiner determines either of a signal obtainment abnormality or the first abnormality of the sensor part when the output signal is not obtained from the one of the sensor parts, or determines the second abnormality of the one of the sensor parts when the obtained output signal includes the abnormality signal having a value indicative of the second abnormality. Such determination, thus, enables the abnormality determiner to classify an abnormality caused in the sensor parts.

13 Claims, 5 Drawing Sheets

(56) References Cited

U.S. PATENT DOCUMENTS

| | | | |
|---|---|---|---|
| 2008/0066994 A1* | 3/2008 | Fujita | B62D 5/0463 180/446 |
| 2013/0253773 A1* | 9/2013 | Itamoto | B62D 5/049 701/43 |
| 2013/0335072 A1* | 12/2013 | Malzfeldt | G01D 5/145 324/207.21 |
| 2014/0130612 A1 | 5/2014 | Takahashi et al. | |
| 2016/0339945 A1 | 11/2016 | Kozawa et al. | |

* cited by examiner

SENSOR DEVICE AND ELECTRIC POWER STEERING DEVICE USING SAME

CROSS REFERENCE TO RELATED APPLICATION

The present application is based on and claims the benefit of priority of Japanese Patent Application No. 2015-151858, filed on Jul. 31, 2015, the disclosure of that is incorporated herein by reference.

TECHNICAL FIELD

The present disclosure generally relates to a sensor device and an electric power steering device using such a sensor device.

BACKGROUND INFORMATION

Generally, a magnetic sensor may have two magnetism detection elements. In a patent document, Japanese Patent No. 5688691 B (patent document 1), detection values from the two magnetism detection elements are compared with each other for abnormality determination, and when the detection value is determined as abnormal, a voltage signal indicative of an abnormal range that is outside of a normal range is outputted to an Electronic Control Unit (ECU).

In the patent document 1, only one kind of abnormality is output as an abnormality determination signal, based on a comparison between the two detection values. However, through an output of the abnormality determination signal as the voltage signal indicative of the abnormal range that is outside of the normal range by an analog communication, information other than abnormality information that indicates whether a magnetic sensor is abnormal cannot be output and be notified to the ECU.

SUMMARY

It is an object of the present disclosure to provide a sensor device that is capable of, by using a controller provided therein, classifying abnormality that is currently caused in the sensor device.

The sensor device of the present disclosure is provided with a sensor part and a controller.

The sensor part has two or more, i.e., a plurality of, sensor elements, an abnormality detector, and an output division. The sensor element detects a physical quantity about a detection object. The abnormality detector detects an internal abnormality. The output division generates and outputs, as an output signal, a digital signal including (i) a sensor signal that corresponds to a detection value of the sensor element, and (ii) an abnormality signal that corresponds to a detection result of the abnormality detector.

The controller has a signal obtainer, an abnormality determiner, and a calculator. The signal obtainer obtains the output signal from the sensor part. The abnormality determiner determines and internal abnormality. The calculator performs a calculation that uses the sensor signal.

The output division stops an output of the output signal, when a detected internal abnormality is a first abnormality, or sets the abnormality signal to a value that indicates a second abnormality, when the detected internal abnormality is a second abnormality that is different from the first abnormality.

The abnormality determiner determines (i) either of (i-a) a signal obtainment abnormality or (i-b) the first abnormality that is caused in the sensor part, when the output signal is not obtained from the sensor part. In the alternative, the abnormality determiner determines, (ii) the second abnormality is caused in the sensor part, when the output signal including the abnormality signal is obtained from the sensor part and takes a value that indicates the second abnormality.

According to the present disclosure, the abnormality determiner may classify an abnormality caused in the sensor part to one of (i) the signal obtainment abnormality or the first abnormality and (ii) the second abnormality based on (i) whether the output signal has been obtained and (ii) the abnormality signal. Thereby, the controller is enabled to perform a suitable process according to the classified abnormality that is being caused in the sensor part.

BRIEF DESCRIPTION OF THE DRAWINGS

Objects, features, and advantages of the present disclosure will become more apparent from the following detailed description made with reference to the accompanying drawings, in that.

DETAILED DESCRIPTION

In the following description, a sensor device of the present disclosure and an electric power steering device using such a sensor device are described based on the drawings.

One Embodiment

One embodiment of the present disclosure is described based on FIGS. 1-5.

Figure 1:
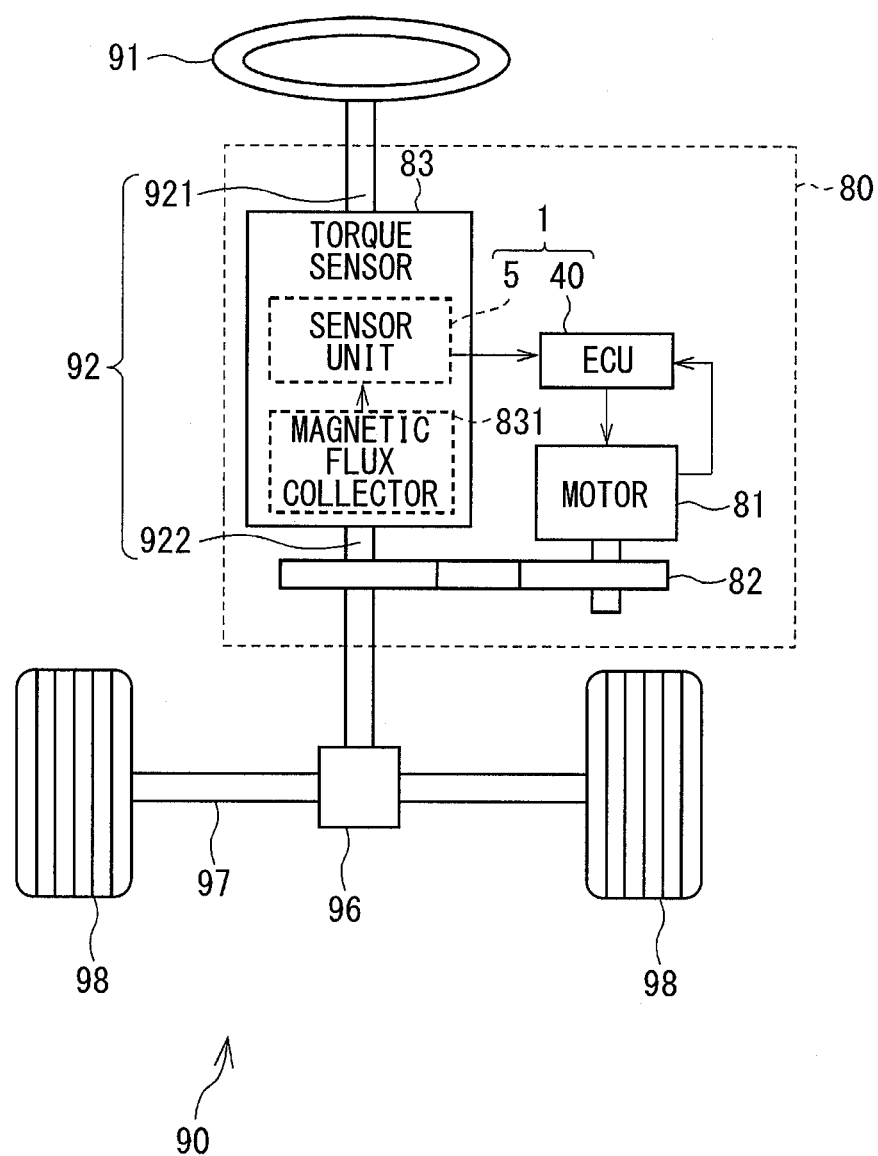
FIG. 1 is a block diagram of an electric power steering device in one embodiment of the present disclosure.

As shown in FIG. 1, a sensor device 1 having a sensor unit 5 and an Electronic Control Unit (ECU) 40 or the like serving as a controller is applied to an electric power steering device 80, for example, for assisting a steering operation of a vehicle.

The configuration of a steering system 90 provided with the electric power steering device 80 is shown in FIG. 1.

A steering wheel 91 serving as a steering member is connected with a steering shaft 92. The steering shaft 92 has an input shaft 921 as a first shaft, and an output shaft 922 as a second shaft. The input shaft 921 is connected with the steering wheel 91. At a position between the input shaft 921 and the output shaft 922, a torque sensor 83 that detects the torque applied to the steering shaft 92 is disposed. A pinion gear 96 is disposed on one end, i.e., on a tip, of the output shaft 922, which is an opposite side of the output shaft 922 relative to the input shaft 921. The pinion gear 96 engages with a rack shaft 97. A pair of wheels 98 is connected with the both ends of the rack shaft 97 via a tie rod etc.

When the driver rotates the steering wheel 91, the steering shaft 92 connected with the steering wheel 91 also rotates. The rotational movement of the steering shaft 92 is converted into the translational movement of the rack shaft 97 by the pinion gear 96, and the pair of wheels 98 is steered by an angle according to the amount of displacement in the translational movement of the rack shaft 97.

The electric power steering device 80 is provided with a motor 81 that outputs an assist torque for assisting a steering operation of the steering wheel 91 by the driver, a speed reduction gear 82 that serves as a power transmission unit, a torque sensor 83, the ECU 40 or the like. Although the motor 81 and the ECU 40 have separate bodies in FIG. 1, they may be combined to have one body.

The speed reduction gear 82 reduces a rotation speed of the motor 81, and transmits the rotation of the motor 81 to the steering shaft 92. That is, although the electric power steering device 80 of the present embodiment is what is called a "column assist type", the steering device 80 may also be a "rack assist type" in which the rotation of the motor 81 is transmitted to the rack shaft 97. In other words, the "drive object" is, in the present embodiment, the steering shaft 92, but the "drive object" may also be the rack shaft 97.

The details of the ECU 40 are mentioned later.

The torque sensor 83 is disposed on the steering shaft 92, and detects a steering torque Ts based on a twist angle between the input shaft 921 and the output shaft 922.

The torque sensor 83 has a torsion bar (not illustrated), a magnetic flux collector 831, the sensor unit 5 and the like.

The torsion bar coaxially connects the input shaft 921 and the output shaft 922 on the rotation axis, and converts a torque applied to the steering shaft 92 into a twist displacement.

The magnetic flux collector 831 has a multipolar magnet, a magnetic yoke, a magnetic collecting ring, etc., and is configured to have the magnetic flux density changed according to an amount of the twist displacement and a twist displacement direction of the torsion bar. Since the torque sensor 83 is well-known in the art, the configuration of the torque sensor 83 is omitted from the description.

Figure 2:
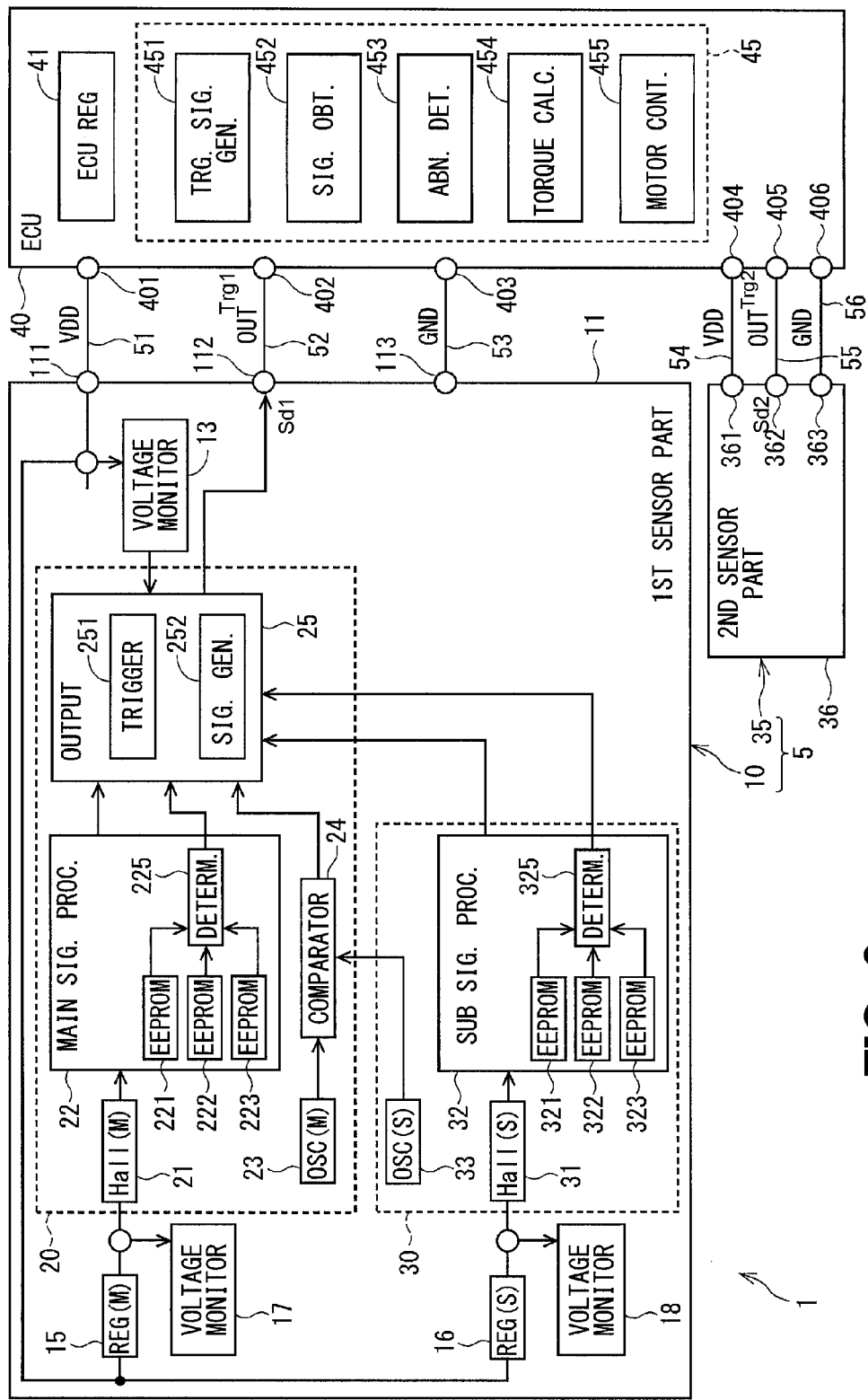
FIG. 2 is a block diagram of a sensor device in the one embodiment of the present disclosure.

As shown in FIG. 2, the sensor unit 5 has a first sensor part 10 and a second sensor part 35.

The first sensor part 10 and the second sensor part 35 detect a change of the magnetic flux of the magnetic flux collector 831, and output, to the ECU 40, output signals Sd1 and Sd2 including a main signal and a sub signal that are the sensor signals corresponding to a detection value.

Since the internal configuration of the first sensor part 10 and the internal configuration of the second sensor part 35 are the same, description concerning the second sensor part 35 is omitted in the following when appropriate, and the configuration of the first sensor part 10 is mainly described and discussed.

In FIG. 2, the "main" may be abbreviated to "(M)" and the "sub" may be abbreviated to "(S)." In FIG. 2, for the ease of reading, some signal wires etc. are omitted.

The first sensor part 10 has a supply voltage monitor 13, a main regulator 15, a sub regulator 16, a main regulator voltage monitoring part 17, a sub regulator voltage monitoring part 18, a main circuit part 20, and a sub circuit part 30 and the like, and these electronic parts are sealed by a sealed part 11.

A power supply terminal 111, a communication terminal 112, and a ground terminal 113 are provided for the sealed part 11. The power supply terminal 111 is connected with a regulator terminal 401 of the ECU 40 by a power supply wire 51, and a supply voltage Vs adjusted to a predetermined voltage (e.g., 5 [V]) is supplied from an ECU regulator 41. The communication terminal 112 is connected with a communication terminal 402 of the ECU 40 by a communication line 52. The communication line 52 is used for the output of the output signal Sd1 and a trigger signal Trg1. The ground terminal 113 is connected with the ground terminal 403 of the ECU 40 by a ground line 53, and is further connected with the ground via the ECU 40.

As for the second sensor part 35, electronic parts of a main circuit part and a sub circuit part together with other parts are sealed by a sealed part 36. A power supply terminal 361, a communication terminal 362, and a ground terminal 363 are provided in the sealed part 36. The power supply terminal 361 is connected with a regulator terminal 404 of the ECU 40 by a power supply wire 54, and the supply voltage Vs is supplied to the terminal 361. The communication terminal 362 is connected with a communication terminal 405 of the ECU 40 by a communication line 55. The communication line 55 is used for the output of the output signal Sd2 and a trigger signal Trg2. The ground terminal 363 is connected with a ground terminal 406 of the ECU 40 by a ground line 56, and is further connected with the ground via the ECU 40.

According to the present embodiment, the output signals Sd1 and Sd2 are outputted to the ECU 40 from the sensor parts 10 and 35 by a Single Edge Nibble Transmission (SENT) communication that is a kind of digital communications.

The supply voltage monitor 13 monitors the supply voltage Vs supplied from the ECU regulator 41. In the present embodiment, when the supply voltage Vs is (i) equal to or greater than a lower threshold Vth1 of a supply voltage normal range that includes a theoretical value Va and (ii) equal to or less than an upper threshold Vth2 of the supply voltage normal range, it is considered that the voltage Vs is normal. When the supply voltage Vs is less than a drivable lower limit voltage VL, it is considered that a voltage fall abnormality is caused. The drivable lower limit voltage VL is defined as a value smaller than the lower threshold Vth1.

When the supply voltage Vs is (i) equal to or greater than the drivable lower limit voltage VL and (ii) less than the lower threshold Vth1 of the supply voltage normal range, it is considered as a low-voltage side temporary abnormality, and when the supply voltage Vs is greater than the upper threshold Vth2, it is considered as a high-voltage side temporary abnormality.

The low-voltage side temporary abnormality and the high-voltage side temporary abnormality are, respectively, a relatively-light, i.e., not so serious, voltage abnormality, which allows, even though the supply voltage Vs is outside of the supply voltage normal range, a continuation of the signal output from the first sensor part 10. The abnormality detection result is outputted to an output part 25.

The main regulator 15 regulates, i.e., adjusts, the supply voltage Vs supplied from the ECU regulator 41, and supplies the adjusted voltage to the main circuit part 20.

The sub regulator 16 regulates, i.e., adjusts, the supply voltage Vs supplied from the ECU regulator 41, and supplies the adjusted voltage to the sub circuit part 30.

The main regulator voltage monitoring part 17 monitors a main regulator voltage Vrm outputted from the main regulator 15. When the main regulator voltage Vrm is outside of a main regulator voltage normal range, it is considered that the main regulator is abnormal (i.e., a main regulator abnormality). The abnormality detection result is outputted to the output part 25.

The sub regulator voltage monitoring part 18 monitors a sub regulator voltage Vrs outputted from the sub regulator 16. When the sub regulator voltage Vrs is outside of a sub regulator voltage normal range, it is considered that the sub regulator is abnormal (i.e., a sub regulator abnormality). The abnormality detection result is outputted to the output part 25.

The supply voltage normal range, the main regulator voltage normal range, and the sub regulator voltage normal range may be all the same range, or may be respectively different ranges.

The main circuit part 20 has a main sensor element 21, a main signal processor 22, a main oscillator 23, a comparator 24, and the output part 25. The sub circuit part 30 has a sub sensor element 31, a sub signal processor 32, and a sub oscillator 33.

The main sensor element 21 and the sub sensor element 31 are the magnetism detection elements that detect a change of the magnetic flux of the magnetic flux collector 831 according to a steering torque. The main sensor element 21 and the sub sensor element 31 of the present embodiment are a Hall device, respectively.

The main signal processor 22 performs signal processing concerning the detection value of the main sensor element 21, and generates the main signal. The generated main signal is outputted to the output part 25.

For the generation of the main signal, parameters memorized by Electrically Erasable Programmable Read-Only Memory (EEPROMs) 221-223 that are three nonvolatile storages are used. The EEPROMs 221-223 respectively memorize the same parameters.

A determination part 225 compares the parameters in the EEPROMs 221-223, and identifies abnormal one of the EEPROMs 221-223 having an abnormality caused therein by the majority determination.

When the parameters of all three or two of the EEPROMs 221-223 are equal, i.e., matching with each other, the determination part 225 considers that the memories (i.e, the EEPROMs 221-223) are normal. When the parameters of all three memories, i.e., the EEPROMs 221-223, are different from each other, the determination part 225 considers that the memories are abnormal (i.e., a memory abnormality). The abnormality detection result is outputted to the output part 25.

When the parameters of all the EEPROMs 221-223 are equal, the parameters memorized by any one of the EEPROMs 221-223 may be used for signal processing.

When the parameters of one of the EEPROMs 221-223 are different from the other two of the EEPROMs 221-223, matching parameters from the other two of the EEPROMs 221-223 are used for signal processing, and the parameters from one of the EEPROMs 221-223 which are different from the parameters of the other two EEPROMs 221-223 are not used.

The sub signal processor 32 performs signal processing concerning the detection value of the sub sensor element 31, and generates the sub signal. The generated sub signal is outputted to the output part 25.

For the generation of the sub signal, the parameters memorized by the EEPROMs 321-323 that are three nonvolatile storages are used. The EEPROMs 321-323 respectively memorize the same parameters.

The process in a determination part 325 is the same as that of the determination part 225 of the main signal processor 22, description of such process is omitted.

The main oscillator 23 generates a predetermined frequency pulse. The pulse of the main oscillator 23 is used in each of the components in the first sensor part 10.

The sub oscillator 33 generates the same frequency pulse as the main oscillator 23. The sub oscillator 33 of the present embodiment is for the monitoring of the main oscillator 23, and is not used for other purposes other than the monitoring.

The comparator 24 compares an oscillation frequency of the main oscillator 23 with an oscillation frequency of the sub oscillator 33, and, when an error of the oscillation frequency is greater than a predetermined value, it is considered that the oscillation frequency is abnormal (i.e., an oscillation frequency abnormality). The abnormality detection result is outputted to the output part 25.

The output part 25 is an interface circuit, and has a trigger detector 251 and a signal generator 252. The trigger detector 251 detects the trigger signal Trg1 transmitted from the ECU 40.

When the trigger signal Trg1 is detected, the signal generator 252 generates the output signal Sd1 using the main signal and the sub signal, and outputs the main signal and the sub signal to the ECU 40 via the communication line 52.

In the present embodiment, the main signal and the sub signal are calculated at a cycle shorter than a signal cycle Pt (refer to FIG. 3.) of the output signal Sd1, and the output part 25 outputs the output signal Sd1 that is generated by using the latest main signal and the latest sub signal to the ECU 40, when the trigger signal Trg1 is detected.

The signal generator 252 stops the output of the output signal Sd1, when at least one of the memory abnormality, the oscillation frequency abnormality, the main regulator abnormality, the sub regulator abnormality, and the voltage fall abnormality is caused.

The memory abnormality, the oscillation frequency abnormality, the main regulator abnormality, and the sub regulator abnormality are an IC operation abnormality in the sensor part 10, and the output signal Sd1 at the time of having one of these abnormalities is not reliable, thereby giving priority to the reliability and stopping the output of the output signal Sd1. When the voltage fall abnormality is caused, the output signal Sd1 is not reliable, thereby giving priority to the reliability and stopping the output of the output signal Sd1.

The details of the output signal Sd1 are mentioned later.

The ECU 40 has the ECU regulator 41 and a calculation processor 45 together with other components.

The ECU regulator 41 adjusts the voltage supplied from a battery that is not illustrated to a predetermined voltage. The supply voltage Vs that is adjusted by the ECU regulator 41 is used in an inside of the ECU 40, and is supplied to the sensor parts 10 and 35.

The calculation processor 45 is constituted mainly as a microcomputer together with other components, and performs various calculation processes.

Each process in the calculation processor 45 may be a software process by executing a pre-memorized program by the Central Processing Unit (CPU), and/or may be a hardware process by a dedicated electronic circuit.

The calculation processor 45 has a trigger signal generator 451, a signal obtainer 452, an abnormality determiner 453, a torque calculator 454, and a motor control part 455 and the like.

The trigger signal generator 451 controls an ON and an OFF of a trigger signal generator element which may be a transistor etc. (not illustrated). The trigger signal generator element is connected with the communication line 52 and with the ground.

When the trigger signal generator element is turned ON, the potential of the communication line 52 equates with the ground potential. By turning ON the trigger signal generator element so that a time period from one falling of the signal to the next falling is a predetermined time period, the pulse of the trigger signal Trg1 is outputted to the first sensor part 10 via the communication line 52.

That is, the communication line 52 is shared by (i) the output of the trigger signal Trg1 from the ECU 40 to the first sensor part 10, and (ii) the output of the first output signal Sd1 from the first sensor part 10 to the ECU 40. Thereby, the number of wires is reduced.

Another trigger signal generator element is connected with the communication line 55 and with the ground.

When this trigger signal generator element is turned ON, the potential of the communication line 55 equates with the ground potential. By the turning ON of the trigger signal generator element for a predetermined time period, the pulse of the trigger signal Trg2 is outputted to the second sensor part 35 via the communication line 55. That is, the communication line 52 is shared by (i) the output of the trigger signal Trg2 from the ECU 40 to the second sensor part 35, and (ii) the output of the second output signal Sd2 from the second sensor part 35 to the ECU 40. Thereby, the number of wires is reduced.

The output signals Sd1 and Sd2 are obtainable at a desired timing of the ECU 40, by (i) outputting the trigger signals Trg1 and Trg2 from the ECU 40 to the sensor parts 10 and 35, and (ii) configuring the output of the output signals Sd1 and Sd2 to be caused in response to the trigger signals Trg1 and Trg2.

The output timing of the trigger signals Trg1 and Trg2 may be the same, or may be different from each other.

When shifting the output timings of the trigger signals Trg1 and Trg2, the output signals Sd1 and Sd2 are obtained for every half cycle of the signal cycle Pt in turn on an ECU 40 side, by shifting one of the output signals Sd1 and Sd2 from the other by a period of a half cycle of the signal cycle Pt. Thereby, the transmission speed of the output signals Sd1 and Sd2 is improved on appearance.

The signal obtainer 452 obtains the first output signal Sd1 from the first sensor part 10, and obtains the output signal Sd2 from the second sensor part 35.

The abnormality determiner 453 determines the abnormality of the first sensor part 10 based on (i) whether the output signal Sd1 has been obtained and (ii) the abnormality signal included in the status signal of the output signal Sd1.

The abnormality determiner 453 determines the abnormality of the second sensor part 35 based on (i) whether the output signal Sd2 has been obtained and (ii) the abnormality signal included in the status signal of the output signal Sd2.

The various calculations are performed in the torque calculator 454 by using at least one of the main signal and the sub signal that are the sensor signals included in the output signals Sd1 and Sd2, when the signals Sd1 and Sd2 are considered as normal. In the present embodiment, the torque calculator 454 calculates the steering torque based on the value of the sensor signal.

The motor control part 455 controls the drive of the motor 81 by using the calculated steering torque. More practically, the motor control part 455 calculates a torque instruction value based on the steering torque, and controls the drive of the motor 81 by a well-known method, e.g., a feedback control, based on the torque instruction value.

Figure 3:
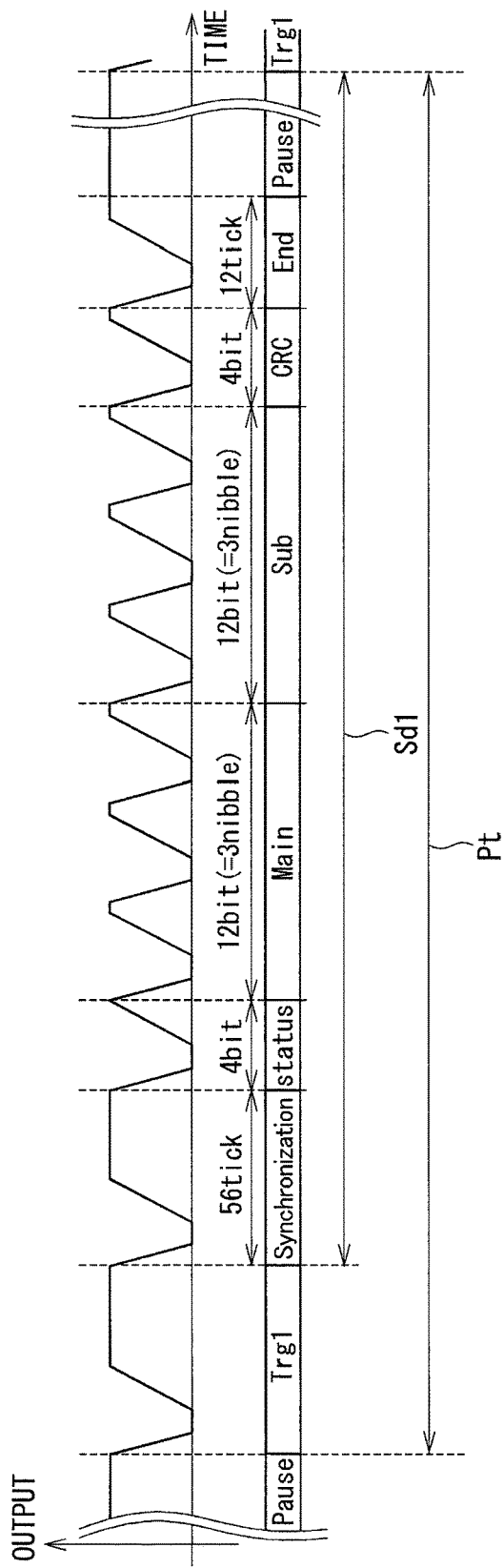
FIG. 3 is a time diagram of an output signal in the one embodiment of the present disclosure.

Here, a communication frame of the first output signal Sd1 is described with reference to FIG. 3.

The output part 25 outputs the first output signal Sd1 in response to the trigger signal Trg1 from the ECU 40. The trigger signal Trg1 is outputted by using the same communication line 52 as the output signal Sd1. Therefore, as shown in FIG. 3, the signal obtainer 452 obtains the pulses of the output signal Sd1 subsequent to the pulse of the trigger signal Trg1. In the present embodiment, the signal cycle Pt is defined as a period from the start of detection of the trigger signal Trg1 to the start of detection of the subsequent trigger signal Trg1.

The first output signal Sd1 includes the synchronization signal, the status signal, the sensor signal (i.e., the main signal and the sub signal in the present embodiment), the Cyclic Redundancy Check (CRC) signal, the end signal and the pause signal, and these signals are outputted as a series of signals in the presently-written order. The number of bits of each signal shown in FIG. 3 is an example, and may be changed according to the telecommunications standard or the like. The data in SENT communication is represented by a time width between a falling edge of one signal and a falling edge of the next signal.

The synchronization signal is a signal for synchronizing the clock of the first sensor part 10 and the clock of the ECU 40, and is set to 56 ticks. In the present embodiment, a correction coefficient is calculated based on the length of the synchronization signal, and each signal is corrected by using the correction coefficient concerned.

The status signal includes an update counter signal and the abnormality signal that indicates an abnormal state of the first sensor part 10. The update counter signal in the present embodiment is a four-bit signal, which is made up from a two-bit update counter signal and a two-bit abnormality signal.

The update counter signal is updated every time the output signal Sd1 is generated as shown in the following manner of a two-bit update counter signal, i.e., 00→01→10→11→00→01 - - - . After the update counter reaches the maximum value of "11", the update counter returns to the minimum value of "00" by an addition of +1. By transmitting the information on the update counter, the ECU 40 is enabled to determine whether the two same data transmitted in a row is caused by the two same detection values or by the data adhesion abnormality among them.

The abnormality signal represents four "values", i.e., "00", "01", "10", and "11", respectively indicating "high-voltage side temporary abnormality", "low-voltage side temporary abnormality", "stop history found", and "normal". Which value represents which state may be arbitrarily definable, e.g., either "00" or "01" may be assigned to "normal".

Here, "normal" means that (i) the output signal Sd1 is normal, and (ii) there is no output stop history so far due to the IC operation abnormality or the voltage fall abnormality. Further, "stop history found" means that (i) the output signal Sd1 is normal, and (ii) there is a record of the output stop history due to, i.e., caused by, the IC operation abnormality or the voltage fall abnormality.

The main signal is a signal based on the detection value of the main sensor element 21, and the sub signal is a signal based on the detection value of the sub sensor element 31. The main signal and the sub signal are represented by 3 nibbles (=12 bits). In the present embodiment, the main signal and the sub signal are implemented as the nibble signal so that the output signal Sd1 is outputted to the ECU 40 by the SENT communication.

The main signal and the sub signal may be, respectively, the nibble signal of at least one nibble, which may be arbitrarily defined according to the communication standard.

The main signal and the sub signal in the present embodiment make a pair of an original signal and an inverted signal, i.e., one signal increases as the detection value increases and the other signal decreases as the detection value increases. The addition (i.e., the sum) of the original signal and the inverted signal is configured to have a preset addition value when both signals are normal. In such manner, the data abnormality is detectable based on the main signal and the sub signal. In FIG. 3, the main signal and the sub signal are drawn in a similar manner for simplification, and for the ease of understanding.

The CRC signal is a cyclic redundancy check signal for detecting a communication error, which has a signal length that is computed based on the main signal and the sub signal.

The end signal is a signal that shows an end of the output of the main signal and the sub signal. Subsequent to the output of the end signal, the pause signal is outputted until the detection of the next synchronization signal.

The second output signal Sd2 includes the synchronization signal, the status signal, the main signal, the sub signal, the CRC signal, the end signal, and the pause signal, and these signals are outputted as a series of digital signals in the presently-written order. Since the communication frame of the second output signal Sd2 is the same as that of the first output signal Sd1, description of the communication frame of the second output signal Sd2 is omitted.

Now, as a reference example, the output of a signal from the sensor part to the ECU in analog communication is described, which enables a notification of abnormality in the sensor part to the ECU by an output of an out-of-bound voltage, i.e., an abnormal voltage outside of a normal range.

In the analog communication, even when an output of the signal from the sensor part is stopped, the output voltage from the sensor part is unpredictable depending on what kind of abnormality is caused in the sensor part. That is, in other words, stopping of the signal output from the sensor part is not useable as a "signal" of abnormality. More practically, in the analog communication, by using single signal wire, it simply enables a notification of information regarding whether an abnormality is being caused, and also about a notification of what kind of abnormality is being caused to the ECU 40.

In the present embodiment, (in view of the above,) the communication between the sensor parts 10, 35 and the ECU 40 is performed as the digital communications, and the abnormality signal is included in the output signals Sd1 and Sd2. Further, a notification of abnormality is enabled by stopping the output of the output signals Sd1 and Sd2. Thereby, the ECU 40 is enabled to determine what kind of abnormality is being caused in the sensor part, i.e., is enabled to distinguishingly recognize two or more, i.e., plural, kinds of abnormality based on the information obtained from single signal wire.

Figure 4:
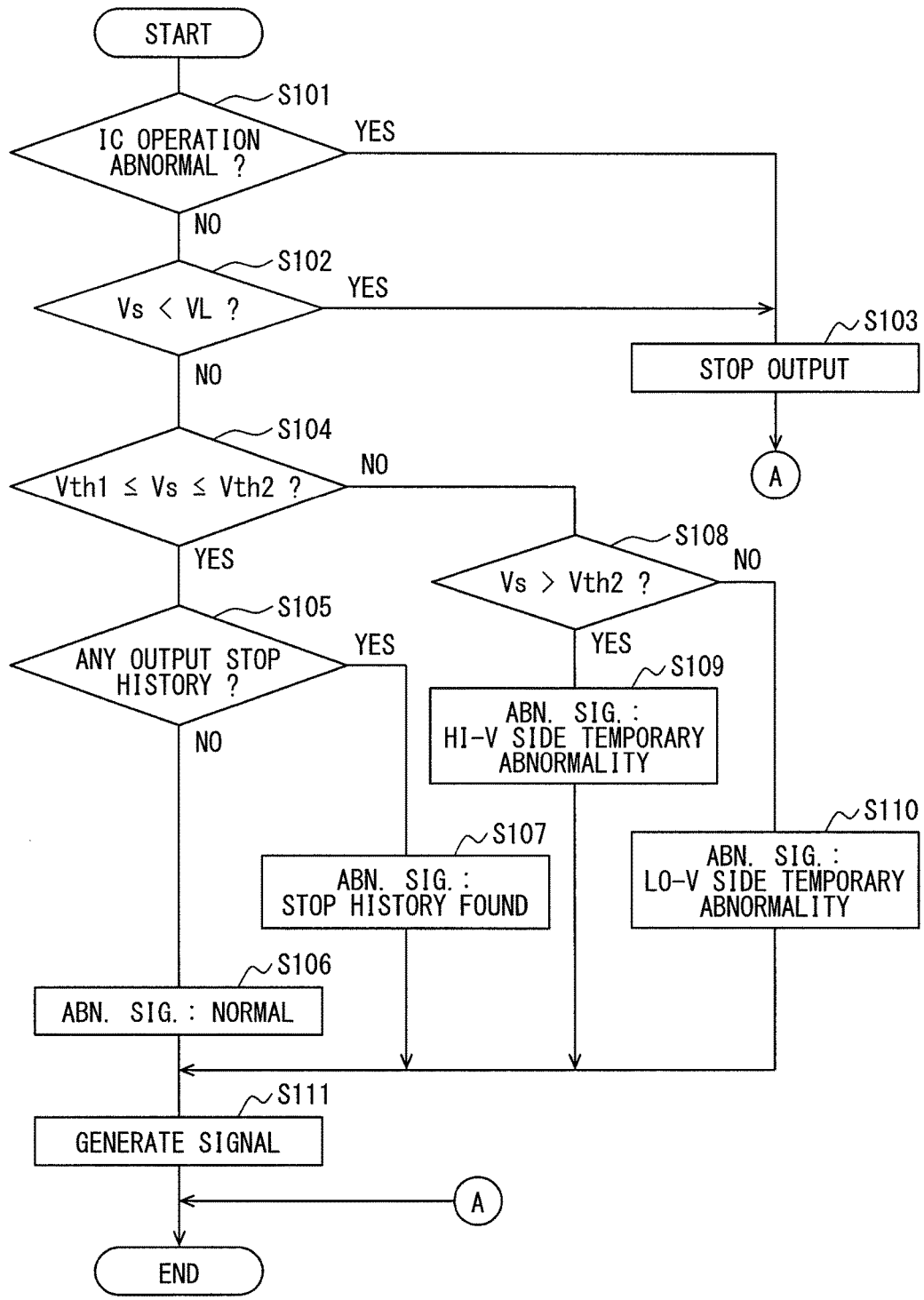
FIG. 4 is a flowchart of a signal output process in the one embodiment of the present disclosure.

Here, the signal output process outputting signals from the sensor parts 10 and 35 is described based on a flowchart shown in FIG. 4. The signal output process is performed as the same process at a predetermined cycle in each of the sensor parts 10 and 35. Here, the process by the first sensor part 10 is described.

In step S101, the signal generator 252 determines whether an Integrated Circuit (IC) operation abnormality is caused. Hereafter, the "step Sxxx" is abbreviated to "S" such as "S101".

The memory abnormality, the oscillation frequency abnormality, the main regulator abnormality, and the sub regulator abnormality are included in the IC operation abnormality.

When it is determined that an IC operation abnormality is caused (S101:YES), the process proceeds to S103.

When it is determined that an IC operation abnormality is not caused (S101:NO), the process proceeds to S102.

In S102, the signal generator 252 determines whether the supply voltage Vs is less than the drivable lower limit voltage VL based on the detection result of the supply voltage monitor 13.

When the supply voltage Vs is determined to be less than the drivable lower limit voltage VL (S102:YES), it is determined that the voltage fall abnormality is caused, and the process proceeds to S103.

When the supply voltage Vs is determined to be equal to or greater than the drivable lower limit voltage VL (S102:NO), the process proceeds to S104.

In S103 that is subsequent to a determination that the IC operation abnormality is caused (S101:YES), or that the voltage fall abnormality is caused (S102:YES), the signal generator 252 stops the output of the first output signal Sd1.

In S104 that is subsequent to a determination that the supply voltage Vs is determined to be equal to or greater than the drivable lower limit voltage VL (S102:NO), the signal generator 252 determines whether the supply voltage Vs is within the supply voltage normal range based on the detection result of the supply voltage monitor 13.

When the supply voltage Vs is determined not to be within the supply voltage normal range (i.e., when the supply voltage Vs is less than the lower threshold Vth1 or greater than the upper threshold Vth2) (S104:NO), the process proceeds to S108.

When the supply voltage Vs is determined to be within the supply voltage normal range (i.e., when the supply voltage Vs is equal to or greater than the lower threshold Vth1 and is equal to or less the upper threshold Vth2) (S104:YES), the process proceeds to S105.

In S105, the signal generator 252 determines whether there is any output stop history of the output signal Sd1.

When it is determined that there is no stop history of the first output signal Sd1 (S105:NO), the process proceeds to S106.

When it is determined that there is a stop history of the first output signal Sd1 (S105:YES), the process proceeds to S107.

In S106, the signal generator 252 sets the abnormality signal included in the status signal to a value that represents "normal".

In S107, the signal generator 252 sets the abnormality signal included in the status signal to a value that represents "stop history found."

When the abnormality signal takes a value that represents "the stop history found/recorded", the ECU 40 is enabled to recognize that the cause of the stop of the signal output is a temporary abnormality such as the IC operation abnormality or the voltage fall abnormality, and is not a permanent abnormality such as a wire disconnection/breakage or the like. Such information is utilizable in the check and maintenance, for example.

Note that, since the main signal and the sub signal that are included in the currently-obtained first output signal Sd1 are normal when the abnormality signal takes a value that represents "stop history found/recorded", the main signal and the sub signal in the currently-obtained first output signal Sd1 are usable for the torque calculation, for example.

In S108 that is subsequent to a determination that the supply voltage Vs is determined not to be within the normal range (S104:NO), the signal generator 252 determines whether the service voltage Vs is greater than the upper threshold Vth2 based on the detection result of the supply voltage monitor 13.

When it is determined that the supply voltage Vs is greater than the upper threshold Vth2 (S108:YES), the process proceeds to S109.

When it is determined that the supply voltage Vs is not greater than the upper threshold Vth2 (i.e., when the supply voltage Vs less than the lower threshold Vth1) (S108:NO), the process proceeds to S110.

In S109, the signal generator 252 sets the abnormality signal included in the status signal to a value that represents "high-voltage side temporary abnormality."

In S110, the signal generator 252 sets the abnormality signal included in the status signal to a value that represents "low-voltage side temporary abnormality."

In S111, the signal generator 252 generates the output signal Sd1, and stores the signal Sd1 to the storages (not illustrated). When the trigger signal Trg1 is detected, the signal generator 252 outputs the latest output signal Sd1 to the ECU 40.

Figure 5:
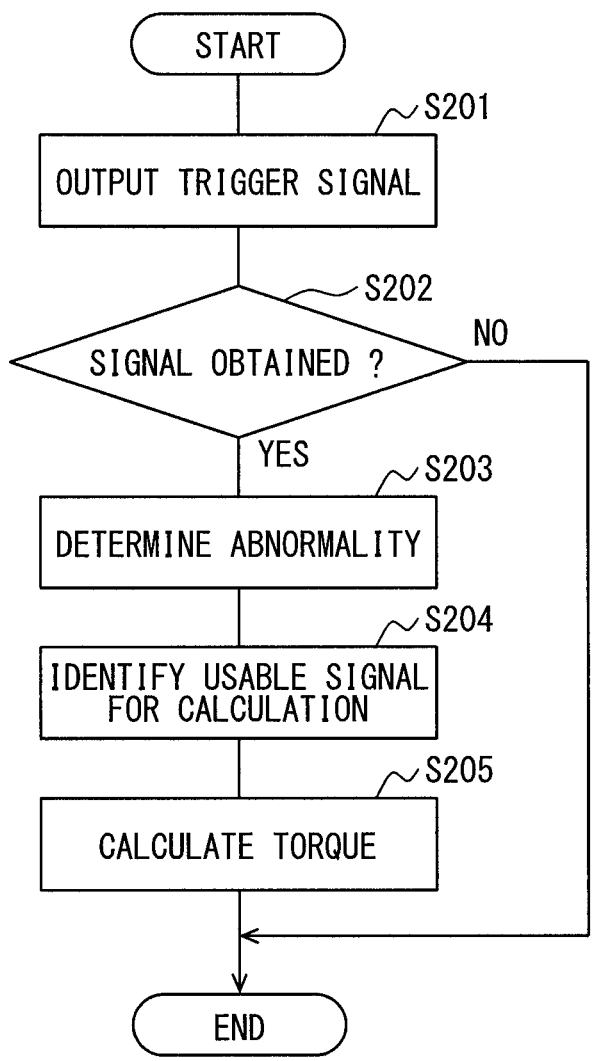
FIG. 5 is a flowchart of a torque calculation process in the one embodiment of the present disclosure.

Next, the torque calculation process in the ECU 40 is described based on a flowchart shown in FIG. 5.

In S201, the trigger signal generator 451 outputs the trigger signals Trg1 and Trg2 to the sensor parts 10 and 35, respectively.

In S202, the signal obtainer 452 determines whether at least one of the output signals Sd1 and Sd2 has been obtained.

When the output signals Sd1 and Sd2 has not been obtained (S202:NO), it is considered that one of the following two cases is caused, and the following processes are not performed. That is, it is considered that (A) the IC operation abnormality or the voltage fall abnormality is caused in the sensor parts 10 and 35, or (B) the signal obtainment abnormality is caused by a disconnection of the communication lines 52 and 55, or by other causes.

When at least one of the output signals Sd1 and Sd2 has been obtained (S202:YES), the process proceeds to S203.

In S203, the abnormality determiner 453 performs an abnormality determination based on (i) an obtainment state of the output signals Sd1 and Sd2 and (ii) the obtained output signals Sd1 and Sd2 themselves.

When the output signal Sd1 has not been obtained, the abnormality determiner 453 determines that either (i) the IC operation abnormality or the voltage fall abnormality is caused in the first sensor part 10, or (ii) the signal obtainment abnormality is caused by a disconnection of the communication line 52, or some other causes.

When the output signal Sd2 has not been obtained, the abnormality determiner 453 determines that either (i) the IC operation abnormality or the voltage fall abnormality is caused in the second sensor part 35, or (ii) the signal obtainment abnormality is caused by a disconnection of the communication line 55, or some other causes.

Further, based on the abnormality signal included in the status signal of the obtained output signals Sd1 and Sd2, the output signals Sd1 and Sd2 is determined, i.e., classified, as either of "normal", "stop history found/recorded", "high-voltage side temporary abnormality", or "low-voltage side temporary abnormality".

The abnormality determiner 453 further determines the adhesion abnormality based on the update information in the status signal, the data abnormality based on the comparison between the main signal and the sub signal, and/or the communication abnormality based on the CRC signal.

In S204, the torque calculator 454 identifies the normal signal as a usable signal for the torque calculation. More practically, from among the obtained output signals Sd1 and Sd2, signals (i) having no adhesion abnormality, no data abnormality, and no communication abnormality, and (ii) having the abnormality signal with a value indicative of "normal" or "stop history found" are identified as the usable signals (i.e., as "considered-as-normal" signals) for the torque calculation.

The signals having (i) having no adhesion abnormality, no data abnormality, and no communication abnormality, and (ii) having the abnormality signal with a value indicative of "high-voltage side temporary abnormality" or "low-voltage side temporary abnormality" may be considered as abnormal, or may be considered as normal and may be used for the torque calculation.

For example, when one of the output signals Sd1 and Sd2 is "normal" or "stop history found" without having adhesion abnormality or the like, while the other one of the output signals Sd1 and Sd2 has "high-voltage side temporary abnormality" or "low-voltage side temporary abnormality", the torque calculation may be performed (i.e., continued) by using the signal that is "normal" or "stop history found".

Further, for example, in case that one of the output signals Sd1 and Sd2 has not been obtained, or is having the adhesion abnormality, the data abnormality, or the communication abnormality, even when the other one of the output signals Sd1 and Sd2 is having a "high-voltage side temporary abnormality" or a "low-voltage side temporary abnormality" without having the other abnormalities, such a signal (i.e., the other one of the Sd1 and Sd2) may be considered as normal, and may be used for continuing the torque calculation.

In S205, the torque calculator 454 performs the torque calculation by using the usable signal identified in S204.

Here, when both of the output signals Sd1 and Sd2 are available, from among four available signals, i.e., the main signals and the sub signals in the output signals Sd1 and Sd2, only one signal may be used for calculation, or other calculated value such as plural average values of the four signals may be used for calculation.

Further, when only one of the output signals Sd1 and Sd2 is available, one of the main signal or the sub signal may be used for calculation, or some other calculated value such as an average of the main signal and the sub signal may be used for the torque calculation. The calculated torque is used for the drive control of the motor 81.

When it is determined in S204 that no usable signal is found from among the output signals Sd1 and Sd2, the torque calculation in S205 is not performed. In the present embodiment, the SENT communication that is digital communications is performed for the output of the detection value from the sensor parts 10 and 35 to the ECU 40. Therefore, the ECU 40 is enabled to classify the abnormality into at least two kinds based on (i) the abnormality signal included in the output signals Sd1 and Sd2 and (ii) whether the output signals Sd1 and Sd2 have been obtained or not.

Further, by using two or more bits as the abnormality signal and by assigning plural kinds of abnormality to each of the representable values of those bits, the ECU 40 is enabled to further classify the detected abnormality into many kinds. Therefore, the ECU 40 can take appropriate processes/actions according to the state of abnormality of the sensor parts 10 and 35.

As described in full details above, the sensor device 1 of the present embodiment is provided with the sensor parts 10 and 35 and the ECU 40.

The first sensor part 10 has plural sensor elements 21 and 31, the supply voltage monitor 13, the main regulator voltage monitoring part 17, the sub regulator voltage monitoring part 18, the comparator 24, the determination parts 225 and 325, and the output part 25. The second sensor part 35 has the same configuration.

The sensor elements 21 and 31 detect the magnetic flux of the magnetic flux collector 831 that is a physical quantity about the detection object.

The supply voltage monitor 13, the main regulator voltage monitoring part 17, the sub regulator voltage monitoring part 18, the comparator 24, and the determination parts 225 and 325 detect the internal abnormality.

More specifically, the supply voltage monitor 13 detects the abnormality of the supply voltage Vs, the main regulator voltage monitoring part 17 detects the abnormality of the main regulator voltage Vrm, the sub regulator voltage monitoring part 18 detects the abnormality of the sub regulator voltage Vrs. The comparator 24 detects the oscillation frequency abnormality of the oscillators 23 and 33, and the determination parts 225 and 325 detect the abnormality of the EEPROMs 221-223, 321-323, respectively.

The output part 25 (i.e., the output division in the claims) generates and outputs the output signal Sd1, which is a digital signal and includes (0 the sensor signal corresponding to the detection values of the sensor elements 21 and 31, and (ii) the abnormality signal corresponding to the detection results of the main regulator voltage monitoring part 17, of the sub regulator voltage monitoring part 18, of the comparator 24, and of the determination parts 225 and 325.

The output division of the second sensor part 35 generates and outputs the output signal Sd2.

The ECU 40 has the signal obtainer 452, the abnormality determiner 453, and the torque calculator 454. The signal obtainer 452 obtains the output signals Sd1 and Sd2 from the sensor parts 10 and 35. The abnormality determiner 453 determines the abnormality of the sensor parts 10 and 35. The torque calculator 454 performs the calculation by using the sensor signal.

The output part 25 stops the output of the output signal Sd1, when the detected internal abnormality is the first abnormality. Further, the output part 25 sets the abnormality signal to have a value that represents the second abnormality that is different from the first abnormality when the detected internal abnormality is the second abnormality.

The abnormality determiner 453 determines that, when the output signals Sd1 and Sd2 are not obtained from the sensor parts 10 and 35, (i) the signal obtainment abnormality is being caused or (ii) the first abnormality is being caused in the sensor parts 10 and 35. Further, the abnormality determiner 453 determines that, when the abnormality signal included in the obtained output signals Sd1 and Sd2 takes a value that represents that the second abnormality is being caused, the second abnormality is being caused in the sensor parts 10 and 35.

Since the output from the sensor parts 10 and 35 to the ECU 40 is performed as the digital communications in the present embodiment, the abnormality determiner 453 is, based on (i) whether the output signals Sd1 and Sd2 have been obtained and (ii) the abnormality signal, the abnormality caused in enabled to classify the abnormality caused in the sensor parts 10 and 35 at least into two categories, i.e., into (i) the signal obtainment abnormality or the first abnormality and (ii) the second abnormality. Thereby, the ECU 40 is enabled to take appropriate processes/actions according to the state of abnormality caused in the sensor parts 10 and 35.

In the present embodiment, the sensor parts 10 and 35 are provided as plural operation sections (i.e., provided in plural pieces), and the sensor parts 10 and 35 respectively output the output signals Sd1 and Sd2 to the ECU 40. That is, the first sensor part 10 outputs the output signal Sd1 to the ECU 40, and the second sensor part 35 outputs the output signal Sd2 to the ECU 40.

Further, the torque calculator 454 performs calculation by using the sensor signals that are included in the output signals Sd1 and Sd2 that are considered as normal.

Thereby, even in case that one of the sensor parts 10 and 35 has abnormality, the calculation by the torque calculator 454 is continuable.

In the present embodiment, the first abnormality includes the abnormality of at least one of the EEPROMs 221-223, 321-323, the oscillators 23 and 33, the main regulator 15, and the sub regulator 16 that are provided in the sensor parts 10 and 35. Further, the first abnormality includes the voltage fall abnormality in which the supply voltage Vs that is the voltage supplied to the sensor parts 10 and 35 falls down to be lower than the drivable lower limit voltage VL.

When the first abnormality is caused, the sensor signal may not be reliable. Therefore, when the first abnormality is caused, a faulty calculation by the ECU 40 is prevented by stopping the output of the output signals Sd1 and Sd2.

The second abnormality includes (i) the high-voltage side temporary abnormality and (ii) the low-voltage side temporary abnormality, in which the supply voltage Vs supplied to the sensor parts 10 and 35 is (a) equal to or greater than the drivable lower limit voltage VL, and (b) outside of the supply voltage normal range, i.e., either exceeding the normal range or falling below the normal range.

In other words, the second abnormality is a relatively light abnormality than the first abnormality, i.e., the second abnormality allows the calculation to be performed by using the sensor signals in the output signals Sd1 and Sd2, for example. Thereby, whether the high-voltage side temporary abnormality or the low-voltage side temporary abnormality is being caused is appropriately notified to the ECU 40.

The abnormality signal is a signal of at least two bits, and is capable of notifying to the ECU 40 that there is a record of a stop (i.e., a history of a stop) of the output signals Sd1 and Sd2 due to the first abnormality, in addition to notifying the abnormal state of the sensor parts 10 and 35.

Therefore, the stop history of the output signals Sd1 and Sd2, i.e., a temporary stop of the output of the signals Sd1 and Sd2, due to the first abnormality is appropriately notifiable to the ECU 40.

The ECU 40 has the trigger signal generator 451 that generates and outputs, to the sensor parts 10 and 35, the trigger signals Trg1 and Trg2 that request for an output of the output signals Sd1 and Sd2. Thereby, the ECU 40 is enabled to obtain the output signals Sd1 and Sd2 at a desired timing.

The output of the trigger signal Trg1 from the ECU 40 to the first sensor part 10 and the output of the output signal Sd1 from the first sensor part 10 to the ECU 40 are performed by the same communication line 52. Similarly, the output of the trigger signal Trg2 from the ECU 40 to the second sensor part 35 and the output of the output signal Sd2 from the second sensor part 35 to the ECU 40 are performed by the same communication line 55. By sharing the communication lines 52 and 55 among (i) the output of the trigger signal Trg1 and Trg2 and (ii) the output of the output signals Sd1 and Sd2, the number of lines, i.e., signal wires, is reducible.

The sensor signal is a nibble signal represented by nibbles. Thereby, the sensor signal is appropriately outputted to the ECU 40 by the SENT communication.

The sensor elements 21 and 31 are the magnetism detection elements that detect a change of the magnetic flux of the magnetic flux collector 831. Further, the sensor elements 21 and 31 detect a change of the magnetic flux due to the change of the torque. More practically, the sensor elements 21 and 31 detect a change of the magnetic flux according to the amount of twist displacement of a torsion bar, and the sensor parts 10 and 35 are used in the torque sensor 83.

Thereby, the torque (i.e., a steering torque in the present embodiment) is appropriately detectable.

The electric power steering device 80 is provided with the sensor device 1, the motor 81, and the speed reduction gear 82. The motor 81 outputs the assist torque that assists the steering operation of the steering wheel 91 by the driver. The speed reduction gear 82 transmits the torque of the motor 81 to the steering shaft 92 that is the drive object of the motor 81.

The ECU 40 has the motor control part 455 that controls the drive of the motor 81 based on the steering torque calculated based on the sensor signal.

In the present embodiment, since the ECU 40 can classify the abnormality of the sensor parts 10 and 35, the ECU 40 can appropriately provide a steering assist according to the abnormally of the sensor parts 10 and 35.

Further, in the present embodiment, the sensor parts 10 and 35 are provided as plural operation sections and the steering assist is continuable by the normal sensor part even when one of the sensor parts 10 and 35 has abnormality, thereby improving the vehicle safety.

In case of continuing the steering assist after having abnormality in one of the sensor parts 10 and 35, the ECU 40 may notify the driver of the vehicle about the abnormality of the sensor parts 10 and 35, e.g., by using a warning lamp and/or by outputting a vocal guidance message.

In the present embodiment, the supply voltage monitor 13, the main regulator voltage monitoring part 17, the sub regulator voltage monitoring part 18, the comparator 24, and the determination parts 225 and 325 correspond to the "abnormality detector." Further, the EEPROMs 221-223, 321-323 correspond to the "non-volatile memories", and the main regulator 15 and the sub regulator 16 correspond to the "voltage regulator."

The abnormality of the supply voltage Vs (i.e., the voltage fall abnormality, the high-voltage side temporary abnormality and the low-voltage side temporary abnormality in the present embodiment), the abnormality of the main regulator 15, the abnormality of the sub regulator 16, the oscillation frequency abnormality, and the abnormality of the EEPROMs 221-223, 321-323 correspond to the "internal abnormality."

The drivable lower limit voltage VL corresponds to the "preset lower limit value", and the supply voltage normal range corresponds to the "normal range", and the high-voltage side temporary abnormality and the low-voltage side temporary abnormality correspond to "the supply voltage abnormality."

The torque calculator 454 corresponds to the "calculator", the trigger signals Trg1 and Trg2 correspond to the "request signal", and the trigger signal generator 451 corresponds to the "request signal generator."

Other Embodiments (a) Output Signal

In the above-mentioned embodiment, the abnormality signal is a 2-bit signal, representing four values of either "normal", "stop history found/recorded", "high-voltage side temporary abnormality", or "low-voltage side temporary abnormality".

In other embodiments, the number of bits of the abnormality signal may be one bit, or may be three bits or more.

The abnormal state assigned to each value represented by the abnormality signal may not be limited to the above, i.e., not limited to "normal", "stop history found/recorded", "high-voltage side temporary abnormality", or "low-voltage side temporary abnormality", but may include other abnormal states, or other abnormality histories.

In the above-mentioned embodiment, the abnormality signal is included in the status signal. However, the abnormality signal may be included in other signals other than the status signal in other embodiments.

In the above-mentioned embodiment, the internal abnormality includes the IC operation abnormality (i.e., the memory abnormality, the oscillation frequency abnormality, the main regulator abnormality, and the sub regulator abnormality), the voltage fall abnormality, the high-voltage side temporary abnormality, and the low-voltage side temporary abnormality. Further, the IC operation abnormality and the voltage fall abnormality are defined as the first abnormality, and the high-voltage side temporary abnormality, and the low-voltage side temporary abnormality are defined as the second abnormality.

In other embodiments, some of the abnormalities in the first abnormality, i.e., one or more of the memory abnormality, the oscillation frequency abnormality, the main regulator abnormality, the sub regulator abnormality, and the voltage fall abnormality, may be excluded from the first abnormality. Further, the first abnormality and the second abnormality may be, respectively, any one of the memory abnormality, the oscillation frequency abnormality, the main regulator abnormality, the sub regulator abnormality, the voltage fall abnormality, the high-voltage side temporary abnormality, and the low-voltage side temporary abnormality. Furthermore, the internal abnormality, the first abnormality, and the second abnormality may include other abnormality other than the above-mentioned abnormalities.

In the above-mentioned embodiment, the update counter is included in the status signal. However, in other embodiments, the update counter may be included in the signals other than the status signal, or the update counter may be omitted.

The communication error detection signal in the above-mentioned embodiment is the CRC signal. However, in other embodiments, as long as the signal is usable by the controller for detecting the communication error, the signal may not be only the CRC signal but any signal. Further, the output signal does not need to include the communication error detection signal.

In the above-mentioned embodiment, one of the main signal and the sub signal is an original signal, and the other of the two is an inverted signal. However, in other embodiments, the main signal and the sub signal do not need to be inverted signal from each other.

In the above-mentioned embodiment, the output signal is outputted to the controller by the SENT communication. However, in other embodiments, as long as the output signal is capable of including the sensor signal and the abnormality signal, any communication method other than the SENT communication may be used.

In the above-mentioned embodiment, the sensor part outputs the output signal to the controller, when the request signal outputted from the controller is detected. However, in other embodiments, the output of the request signal from the controller may not be performed, and the output of the output signal may be performed by an initiative of the sensor part. In such configuration, a section for controlling the output of the request signal in the controller is omissible.

When the request signal is not output from the controller, the output timing may be synchronized among plural sensor parts, or each of the plural sensor parts may output the output signal at their own timings.

Even when the request signal is not used, the transmission speed on appearance may be similarly improved by shifting the output timings among the two sensor parts by an amount of half signal cycle.

When the sensor part is provided as three or more parts, the output signal may be obtained at equal intervals by the controller by shifting the output timings among the three or more sensor parts by an amount of the divided signal cycle divided by the number of sensor parts. Further, the among of shift of the signal output timings among the plural sensor parts may not only be the amount of the divided signal cycle by the number of sensor parts, but may also be any amount. In case that the amount of shift is set to zero among the plural sensor parts, the output of the output signal is simultaneously performed by the plural sensor parts.

In the above-mentioned embodiment, the output of the request signal from the controller and the output of the output signal from the sensor part are performed by the same communication line. However, in other embodiments, the output of the request signal from the controller to the sensor part and the output of the output signal from the sensor part to the controller may be performed by different communication lines.

(b) Sensor Part

In the above-mentioned embodiment, the supply voltage monitor, the main regulator voltage monitoring part, the sub regulator voltage monitoring part, the comparator, and the determination part correspond to the abnormality determiner. However, in other embodiments, some of the supply voltage monitor, the main regulator voltage monitoring part, the sub regulator voltage monitoring part, the comparator, and the determination part may be omitted. Further, in other embodiment, other detector detecting the internal abnormality of the sensor part other than the supply voltage monitor, the main regulator voltage monitoring part, the sub regulator voltage monitoring part, the comparator, and the determination part may be used as the abnormality detector.

Regarding the voltage monitoring of the regulator, at least one of the main regulator monitoring part and the sub regulator monitoring part may be omitted. Further, a comparison monitoring part may be provided instead of providing the main regulator monitoring part and the sub regulator monitoring part, for the comparison of the main regulator voltage with the sub regulator voltage. The comparison monitoring part compares the main regulator voltage with the sub regulator voltage, and when they are different from each other, it may be considered as a voltage regulator abnormality, which is the abnormality of one of the main regulator or the sub regulator.

Further, a data comparison monitoring part that compares the main data with the sub data may be provided. The data comparison monitoring part compares the main data with the sub data, and when they are different from each other, it may be considered that a circuit that generates the main data (i.e., the main regulator, the main sensor element, the main signal processor) or a circuit that generates the sub data (i.e., the sub regulator, the sub sensor element, the sub signal processor) is abnormal. When the main data is different from the sub data, it may be desirable to stop the output of the output signal, assuming that the first abnormality is being caused during which the sensor signal is not reliable.

In the above-mentioned embodiment, three EEPROMs are provided in the main circuit part, and three EEPROMs are provided in the sub circuit part. However, in other embodiments, the number of the non-volatile storages may not only be three but any number. For example, when the number of EEPROMs is two and two parameters are inconsistent, it may be considered as the memory abnormality. Further, the non-volatile storage may be shared by the main circuit part and the sub circuit part. Further, the non-volatile storages may be a device other than the EEPROM.

In the above-mentioned embodiment, the sensor part has the two oscillators and uses one of the two oscillators as a monitoring oscillator. However, in other embodiments, the oscillator for the monitoring may be omitted. The main oscillator may be used for the monitoring.

In the above-mentioned embodiment, the voltage is supplied to the main circuit part from the main regulator, and the voltage is supplied to the sub circuit part from the sub regulator. However, in other embodiments, the sensor part may have only one built-in regulator, and that one regulator may supply the voltage to both of the main circuit part and the sub circuit part.

In the above-mentioned embodiment, the sensor part has two sensor elements. However, in other embodiments, the sensor part may have three or more sensor elements. In such case, an abnormal sensor element that has the abnormality caused therein is determinable by the majority determination, and, when at least two sensor elements are normal, it may be considered that the sensor part is normal and the detection of the physical quantity may be continued.

The sensor element of the above-mentioned embodiment is the Hall device. However, in other embodiments, the sensor elements may be a magnetism detection element other than the Hall device, or may detect a physical quantity other than the magnetism.

In the above-mentioned embodiment, the sensor part is used in the torque sensor that detects the steering torque. However, in other embodiments, the sensor part may be a sensor device that detects any physical quantity, e.g., a torque other than the steering torque, the rotation angle, the stroke, the load, or the pressure.

(c) Sensor Device

In the above-mentioned embodiment, two sensor parts are provided in one sensor device. However, in other embodiments, the number of the sensor parts provided in the sensor device may be one, or may be three or more.

In the above-mentioned embodiment, the sensor device is applied to the torque sensor of the electric power steering device. However, in other embodiments, the sensor device may be applied to an in-vehicle device other than the electric power steering device, or may be applied to a device that is not disposed in a vehicle.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A sensor device comprising a sensor including:
  a plurality of sensor elements configured to detect a physical quantity of a detection object;
  an abnormality detector including:
    a supply voltage monitor configured to detect an abnormality of a supply voltage to the sensor,
    a regulator voltage monitor configured to detect an abnormality of a voltage regulator in the sensor,
    a comparator configured to detect an abnormality of an oscillator in the sensor, and
    a determination part configured to detect an abnormality of a memory in the sensor, the abnormality detector configured to detect an internal abnormality of the sensor; and
an output configured to generate and output a digital signal as an output signal of the sensor, wherein the output signal includes a sensor signal and an abnormality signal, the sensor signal includes detection values of the plurality of sensor elements, and the abnormality signal includes a detection result from the abnormality detector;
a controller including:
a signal obtainer configured to obtain the output signal from the sensor;
an abnormality determiner configured to determine an abnormality of the sensor; and
a calculator configured to perform a calculation based on the sensor signal, wherein
the output is further configured to:
determine whether the internal abnormality is a first abnormality or a second abnormality,
stop an output of the output signal, when the internal abnormality is the first abnormality, and
set the abnormality signal to a value that indicates second abnormality, when the internal abnormality is the second abnormality, and wherein
the abnormality determiner is further configured to determine
either a signal obtainment abnormality or the first abnormality of the sensor, when the output signal is not obtained from the sensor, or
the second abnormality of the sensor, when the output signal including the abnormality signal with the value indicating the second abnormality is obtained from the sensor.

2. The sensor device of claim 1, wherein
the sensor is provided in plural pieces, and
each of the plural pieces of the sensor outputs the output signal to the controller.

3. The sensor device of claim 2, wherein
the calculator performs calculation based on the sensor signal included in the output signal that is considered as normal.

4. The sensor device of claim 1, wherein
the first abnormality includes at least one of (i) an abnormality of the memory, (ii) an abnormality of the oscillator and (iii) an abnormality of the voltage regulator.

5. The sensor device of claim 1, wherein
the first abnormality includes a voltage fall abnormality, in which the supply voltage supplied to the sensor falls to be lower than a preset lower limit value.

6. The sensor device of claim 5, wherein
the second abnormality includes a supply voltage abnormality, in which the supply voltage is equal to or greater than the preset lower limit value, and is outside of a normal range.

7. The sensor device of claim 1, wherein
the abnormality signal has at least two bits, and
the abnormality signal is capable of notifying, to the controller, a history of a stop of the output signal due to the first abnormality, and an abnormal state of the sensor.

8. The sensor device of claim 1, wherein
the controller includes a request signal generator that generates and outputs a request signal requesting the sensor part for an output of the output signal from the sensor.

9. The sensor device of claim 8, wherein
the output of the request signal from the controller to the sensor, and the output of the output signal from the sensor to the controller are respectively performed by using a same communication line.

10. The sensor device of claim 1, wherein
the sensor signal is a nibble signal represented by nibbles.

11. The sensor device of claim 1, wherein
the plurality of sensor elements comprise a magnetism detection element detecting a change of magnetic flux from the detection object.

12. The sensor device of claim 11, wherein
the plurality of sensor elements respectively detect a change of magnetic flux according to a change of a torque.

13. An electric power steering device comprising:
the sensor device of claim 12;
a motor configured to output an assist torque that assists a steering operation of a steering member by a driver of a vehicle; and
a speed reduction gear configured to transmit the assist torque of the motor to a drive object, wherein
the controller includes a motor controller configured to control a drive of the motor based on a steering torque that is calculated based on the sensor signal.

* * * * *